(12) United States Patent
Naoe et al.

(10) Patent No.: US 6,428,884 B1
(45) Date of Patent: Aug. 6, 2002

(54) MAGNETIC RECORDING MEDIUM

(75) Inventors: Koji Naoe; Kiyomi Ejiri, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/602,353

(22) Filed: Jun. 23, 2000

(30) Foreign Application Priority Data

Jun. 24, 1999 (JP) .......................................... 11-178148

(51) Int. Cl.[7] .............................................. G11B 5/714
(52) U.S. Cl. ........................ 428/323; 428/336; 428/402; 428/425.9; 428/694 BS; 428/694 BA; 428/694 BN
(58) Field of Search ................................ 428/323, 332, 428/425.9, 694 B, 694 BS, 694 BA, 694 BH, 694 BU, 694 BN, 900, 402, 336

(56) References Cited

U.S. PATENT DOCUMENTS

| | | | |
|---|---|---|---|
| 5,718,964 A | | 2/1998 | Naoe et al. .................. 428/141 |
| 5,906,885 A | * | 5/1999 | Yoshimura et al. .......... 428/212 |
| 6,139,937 A | * | 10/2000 | Sato et al. .................. 428/141 |

FOREIGN PATENT DOCUMENTS

| | | | |
|---|---|---|---|
| JP | 05-314467 | * | 11/1993 |

OTHER PUBLICATIONS

Derwent Translation of JP5–314467–A.*
Derwent Translation of JP10–340805–A.*
Derwent Abstract of JP–05314467 A (Derwent Acc. No. 1994–002893).*
Derwent Abstract of JP–10340805 A (Derwent Acc. No. 1999–116661).*

* cited by examiner

Primary Examiner—Stevan A. Resan
Assistant Examiner—Kevin M. Bernatz
(74) Attorney, Agent, or Firm—Stroock & Stroock & Lavan LLP

(57) ABSTRACT

Described is a magnetic recording medium comprising, on a flexible nonmagnetic support, a nonmagnetic layer containing a nonmagnetic powder and a binder, and a magnetic layer containing a ferromagnetic powder and a binder in this order. The average thickness, d, of the magnetic layer is from 0.01 to 0.3 μm, and the average particle number, m, of the ferromagnetic powder existing in the magnetic layer thickness direction is in the range of 1 to 20.

10 Claims, No Drawings

MAGNETIC RECORDING MEDIUM

BACKGROUND OF THE INVENTION

1. Field of the Invention

This invention relates to a magnetic recording particulate medium which comprises a flexible support having provided thereon a magnetic layer comprising a ferromagnetic powder and a binder, and which exhibits a high output and a good C/N ratio under high-density recording and which is suitable for recording and reproducing digital signals at high densities.

2. Description of Related Art

In recent years, a recording wavelength tends to be shorter along with high densification, and if the magnetic layer is thick, the output tends to be lowered, thereby raising problems in a self-demagnetization loss during recording and a thickness loss during reproducing. Therefore, a magnetic layer is tried to be thinner, but the influence of a nonmagnetic support may easily appear on the surface of the magnetic layer when the magnetic layer having a thickness equal to or less than 2 $\mu$m is directly applied to the support, and a deteriorating tendency in electromagnetic characteristics and dropouts are seen.

To solve such problems, there has been proposed a method for forming a thin thickness magnetic layer and a nonmagnetic layer under the magnetic layer, on a nonmagnetic support, by using a simultaneous multilayer coating technique as well as a concentrated coating liquid for the magnetic layer as disclosed in Japanese Unexamined Patent Publication (KOKAI) Showa No. 63-191,315 and Japanese Unexamined Patent Publication (KOKAI) Showa No. 63-187,418, thereby obtaining a magnetic recording medium having an improved electromagnetic characteristics in excellent production yields.

In digital VCR systems for consumer use, magnetic recording film medium (or what is called ME tapes), in which a magnetic recording layer comprises a vacuum deposited cobalt alloy, are used in practice. But, in order to manufacture magnetic recording particulate tapes, what is called MP tapes, applicable to the digital VCR systems for consumer use, an improvement in Over Write erasing property is required while having a high output for data signals and securing an output for tracking signals. The present inventors proposed a magnetic recording particulate tape satisfying the above demands by increasing a filling degree of a magnetic layer while making the magnetic layer thinner (See, Japanese Unexamined Patent Publication (KOKAI) Heisei No. 11-185,240.

In the digital VCR systems for consumer use, an apparatus (amplifier) noise is high, and therefore, a total noise consisting of the apparatus noise and a medium noise is determined by the apparatus noise. Thus, lot of attention has not been paid to the medium noise in practical use. Under the standard of the digital VCR systems for consumer use, however, it is required to make the medium noise within –2 dB with respect to a ME reference tape.

In addition, disc systems or tape systems mounting an MR head (magneto resistive head) have recently been developed, and a demand for reducing medium noises of the magnetic recording media used in those systems becomes higher. In the thin metal film type of magnetic recording medium, a thickness of a magnetic layer is made thinner and a crystal particle is made smaller to increase the number of the magnetic particles per unit volume, thereby reducing the medium noise ["Study of Vapor Deposited Thin Layer Tape for MR head in Helical Scan Systems", Nihon Ouyo Jiki Kiroku Gakkai Shi (Journal of Applied Magnetic Recording Society of Japan), VOL. 22 Supplement No. S3, 1998, (Seiichi Onodera, et al.)].

On the other hand, reduction of the medium noise in the magnetic recording particulate medium is not enough in comparison with that in the magnetic recording film medium, so, when the magnetic recording particulate medium is used in a system mounting the MR head as a reproduction head, the following problems are raised, in terms of reduction of the medium noise:

(1) A filling degree of a magnetic layer is lower in comparison with that of the film medium, as well as the number of the magnetic particles per unit volume is smaller.

(2) A surface roughness across a wide wavelength area [especially, a pitch roughness from 1 to 20 $\mu$m] is generated during the coating operation of the magnetic layer and the nonmagnetic layer.

(3) Fluctuation of the magnetic layer thickness by coating is generated [this is raised as a problem especially in saturation recording systems].

(4) Keeping uniformity of the magnetic particles is difficult because the nonmagnetic material is added in the magnetic layer.

SUMMARY OF THE INVENTION

It is an object of the present invention to provide a magnetic recording particulate medium capable of reducing a medium noise and exhibiting a high C/N ratio even under high-density magnetic recording such as that employed in the system utilizing an MR head.

The present inventors improved the magnetic recording medium described in the aforementioned Japanese Unexamined Patent Publication (KOKAI) Heisei No. 11-185,240 as a basis so as to respond to the above problems, finding a magnetic recording medium having high output and fully low noise, and therefore the present invention has been accomplished.

The present invention relates to a magnetic recording medium comprising, on a flexible nonmagnetic support, a nonmagnetic layer containing a nonmagnetic powder and a binder, and a magnetic layer containing a ferromagnetic powder and a binder in this order, characterized in that the magnetic layer has an average thickness d from 0.01 to 0.3 $\mu$m and the average particle number m of the ferromagnetic powder existing in a thickness direction of the magnetic layer is in the range of from 1 to 20.

In the magnetic recording medium of the present invention, it is preferable that the particle of the ferromagnetic powder contained in the magnetic layer has an acicular shape where a mean length l of the major axis ranges from 0.02 to 0.15 $\mu$m and a ratio d/l of an average thickness d of the magnetic layer to the mean length of the major axis l is equal to or less than 4.

In the magnetic recording medium of the present invention, it is further preferable that the particle of the ferromagnetic powder contained in the magnetic layer has a flat acicular shape and that the flat acicular magnetic powder has an aspect ratio of a cross section in a direction perpendicular to the major axis being more than 1.

MODE FOR CARRYING OUT THE INVENTION

A magnetic recording medium according to the present invention is characterized in that the average thickness d of a magnetic layer ranges from 0.01 to 0.3 µm and the average particle number m of a ferromagnetic powder existing in a thickness direction of the magnetic layer is in the range of from 1 to 20.

In recording and reproducing with a conventional magnetic induction head, if the magnetic layer is made thin to the extent mentioned above, a magnetization amount becomes smaller, and a reproduction output is lowered. When an MR head is used for reproduction, however, its sensitivity is sufficiently high, thereby a sufficient output and an improvement in a resolution property which is an advantage resulting from the thin magnetic layer can be obtained. In other words, by making the average value d of the thickness of the magnetic layer equal to or higher than 0.01 µm, desirable magnetism is secured, and by making the average value d equal to or less than 0.3 µm, the resolution property can be enhanced, thus the C/N ratio in the MR head can be improved. Particularly, the average value d of the thickness of the magnetic layer is preferably in the range of from 0.01 µm to 0.2 µm, more preferably from 0.01 µm to 0.1 µm, from the viewpoint of securing the resolution property because the magnetic layer is easily saturated with the high sensitive MR head.

Further, in the magnetic recording medium of the present invention, the average particle number m of the ferromagnetic powder existing in the thickness direction of the magnetic layer is in the range of from 1 to 20. As the results of diligent study made by the present inventors, it has been revealed that the number of magnetic particles existing in a magnetic layer thickness direction decides a dependency of a magnetic layer filling degree, or Bm. More specifically, it has been revealed, when the number of the magnetic particles existing in the magnetic layer thickness direction is more than 20, no substantial dependency of Bm is found, but when the number is equal to or less than 20, Bm becomes improved as the number of magnetic particles existing in the magnetic layer thickness direction is decreased.

It has been further found that, in the same manner as that of Bm, surface properties of the magnetic layer become improved by reduction of the number of the magnetic particles existing in the magnetic layer thickness direction. The average particle number m of the ferromagnetic powder existing in the thickness direction of the magnetic layer is preferably in the range of from 2 to 10, more preferably from 2 to 6.

It has been found out from the results of the observation of the cross section of the magnetic powder, provided a length of the major axis of the magnetic material particle is 1, making a magnetic layer average thickness d thinner and a deterioration of the ratio d/l lead to amelioration of tangle of the acicular magnetic particles, thereby decreasing fluctuation of orientation in the magnetic layer thickness direction of the magnetic particles. Due to this, the surface properties of the magnetic layer become smooth and the filling state of the magnetic material particle becomes improved, thus to enhance the Bm. Therefore, the magnetic recording medium of the present invention preferably has the magnetic layer containing the particle of the ferromagnetic powder having an acicular shape and a mean length l of major axis in the range of from 0.02 to 0.15 µm, where a ratio d/l of an average thickness d of the magnetic layer to a mean length l of major axis of the particle of the ferromagnetic powder is equal to or less than 4. The mean length l of major axis of the acicular ferromagnetic powder is preferably in the range of from 0.04 to 0.12 µm, and the ratio d/l of an average thickness d of the magnetic layer to a mean length l of major axis of the particle of the ferromagnetic powder is preferably in the range of from 2 to 0.06. By setting the parameters within these ranges, particle size orientation during the coating operation or in the calendering process in the magnetic layer thickness direction can be improved.

Further, in order to enhance the particle size orientation during the coating operation, it is further preferable to adjust the length l of major axis and the solid concentration of magnetic liquid so as to set a h/l ratio equal to or less than 6, provided that a magnetic liquid film thickness immediately after coated is h and a length of a major axis of a flat acicular magnetic particle is l. The particle size orientation can be further improved by smoothing the magnetic layer surface with a smooth member at a stage where the coated film is dried to some extent. The particle size orientation is also improved by raising a coating speed to apply shearing force to the coating liquid. As for the coating liquid, a particle orientation property in the coating liquid can be improved by weakening initial drying of the coated film so as to enhance a thixotropy property of viscosity as well as restrain eddy flows of the liquid.

Even when the number of magnetic particles existing in the magnetic layer thickness direction becomes small, a molding property of the magnetic layer in the calendering process can be secured by designing so as to secure voids in the magnetic layer. Also, by providing a nonmagnetic layer and securing a molding property of the nonmagnetic layer in the calendering process, reducing unevenness of an interface between the upper layer and lower layer and making the magnetic layer surface smooth become possible.

Furthermore, in the magnetic recording medium of the present invention, the particle of the ferromagnetic powder contained in the magnetic layer has preferably a flat acicular shape, and the particle of flat acicular ferromagnetic powder preferably has an aspect ratio of more than 1 of the cross section in a direction perpendicular to the major axis. The flat acicular ferromagnetic powder has a tendency to orientate the magnetic material so as to make the longer width in parallel with the base plane during coating of the magnetic layer, and therefore, the orientation property of the magnetic material in the magnetic layer thickness direction is improved, thus to provide advantages such as improving the surface properties and Bm of the magnetic layer.

The flat acicular ferromagnetic powder is elliptical or polygonal powder where a cross section of a minor axis cut in a direction perpendicular to the major axis has both a longer width and a shorter width. As the flat acicular ferromagnetic powder usable in the present invention, for example, flat acicular ferromagnetic metal powder described in Japanese Unexamined Patent Publication (KOKAI) Heisei No. 10-340805 can be exemplified.

A ratio of the longer width to the shorter width of the flat acicular magnetic particle is more than 1, preferably equal to or higher than 1.5, more preferably equal to or higher than 2.0. There is an advantage that the ratio of the longer width to the shorter width becomes larger, the orientation property of the magnetic material in the magnetic layer thickness direction is further improved.

The flat acicular ferromagnetic powder is manufactured by a method described in, for example, Japanese Unexamined Publication (KOKAI) Heisei No. 10-340805. That is, by adding a water-soluble Al salt and a rare earth metal salt such as Y to a reaction system which generates iron oxyhydroxide to produce a Co-containing iron oxyhydroxide in which Al and a rare earth metal such as Y and the like are solidly solved, and by adjusting a content ratio of the rare earth metal, such as Co/Al/Y or the like, the flat-shaped iron oxyhydroxide can be produced. Then, the iron oxyhydroxide is subjected to reduction, sintering and slow oxidation, thereby capable of obtaining the flat acicular ferromagnetic powder. As for the Co-containing iron oxyhydroxide in which Al and a rare earth metal such as Y and the like are solidly solved, it is preferable from the viewpoint of raising effectively the longer width/shorter width ratio that a Co content is from 5 to 50 at %, preferably from 20 to 35 at %; an Al content is from 0.1 to 12 at %, preferably from 3 to 8 at %; a content of the rare earth metal such as Y or the like is from 0.1 to 12 at %, preferably from 3 to 8 at %; and an atomic ratio of the Al to the rare earth metal is in the range of from 0.5 to 2.

The shorter width length of the cross section of the flat acicular magnetic particle ranges from 2 to 20 nm, preferably from 5 to 15 nm. As the shorter width length is smaller, a lot of the magnetic particles can exist in the magnetic layer thickness direction. Also, the difference in level at the overlapped particles in the thickness direction becomes small, so the magnetic layer surface becomes smooth. When the shorter width length is too small, however, it has a problem that σs may not be secured. Therefore, in a system, such as the digital VCR system for consumer use, which requires a thin layer magnetic layer with high Br, the shorter width length is preferably from 10 to 15 nm. When the shorter width length is higher than 20, thus resulting in larger magnetic particles, the number of the magnetic particles per unit volume cannot be increased, and therefore reducing the medium noise tends to be difficult in the MR head mounting system. Also, since the effect of the molding of the magnetic layer in the calendering process is lowered, it might be difficult to obtain a magnetic layer with a thin thickness and a less thickness fluctuation, or a magnetic layer with a smooth surface property and a uniformly high filling degree.

In the magnetic recording medium of the present invention, the amount of a nonmagnetic powder in the magnetic layer, especially the amount of a binder resin with a low true specific gravity, is preferably in the range of from 5 to 15 parts by weight with respect to the ferromagnetic powder of 100 parts by weight. With the above range, adequate voids can be formed when the coated film is formed, and moldability during the calendering process in a system having less number of the magnetic particles existing in the magnetic layer thickness direction can be secured.

If the binder resin amount is too large, an easily orientating tendency of the acicular magnetic particle and moldability in the calendering process tends to be lowered. In other words, it is preferable to render the binder resin amount as smaller as possible within the range in which the dispersibility of the magnetic particle in the magnetic liquid can be secured. Due to this, it is preferable to use such binders as adsorbing to the magnetic particle surface in the magnetic liquid as well as forming long molecular chains having adequate hardness. Consequently, spaces between the magnetic particles in the magnetic liquid can be widened, and even if the binder amount is small, an aggregation property of the magnetic particles can be restrained. In addition, the aggregation property of the magnetic particles in the coating and drying processes can be restrained, thereby capable of forming a magnetic layer having a smoother surface property and less aggregation disorder of the magnetic particles. That is, a magnetic recording medium having low medium noise can be manufactured. As the binder, a polyurethane resin having a polar group is used, and it is further preferable that said polyurethane resin is a polyurethane containing a cyclic structure and an ether group, a branched aliphatic polyester polyurethane, a polyurethane having a dimerdiol structure, or the like. Said urethane resins may be used alone or in combination, but it is preferable to set the existing ratio of the urethane resin to be from 50 to 100% by weight in the binder of the magnetic layer.

Furthermore, in the manufacturing method of the magnetic recording medium according to the present invention, the calendering process is preferably conducted under the following conditions. It is adequate that a first roller nip consists of metal rollers; nip line pressure is equal to or higher than 300 kg/cm, preferably equal to or higher than 400 kg/cm; and that a treating speed is equal to or less than 150 m/minute, preferably equal to or less than 100 m/minute, further preferably equal to or less than 30 m/minute. Adequately, the temperature is in the range of from 70 to 100° C., and it is preferred to occasionally set the temperature within this range, in consideration of moldability tendency of the upper and lower layers affected by Tg, the kind, and the amount of the binders in the upper layer (magnetic layer) and the lower layer (nonmagnetic layer).

In the present invention, the magnetic layer is not limited to be a single layer, and two or more layers are possible.

It is to be noted that the maximum value of each measured value of the magnetic layer thickness is preferably in the range of approximately from a value given by multiplying d by 1.0 to a value given by multiplying d by 3. In addition, the minimum value of the above measured value is preferably in the range of approximately from a value given by multiplying d by 0.4 to a value given by multiplying d by 1.

The magnetic recording medium according to the present invention will be explained further in detail as follows.

Ferromagnetic metal powder used in the present invention is not particularly limited, but Fe and alloy having Fe as a main component are preferred. The ferromagnetic metal powder may contain atoms, other than the predetermined atom, such as Al, Mg, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, or B. It is especially preferred to contain, other than Fe, at least one of Al, Mg, Si, Ca, Y, Ba, La, Nd, Co, Ni, and B.

Before dispersed, the ferromagnetic metal powder may be treated with, for example, a dispersant, a lubricant, a surfactant, or an antistatic agent as described later. It is specifically described in U.S. Pat. Nos. 3,026,215, 3,031, 341, 3,100,194, 3,242,005, 3,389,014, 5,591,535 and the like.

The ferromagnetic metal powder may contain a small amount of hydroxides or oxides. Usable are the ferromagnetic metal powder obtained from known manufacturing methods, and the following methods can be exemplified; a method for reduction with composite organic acid salt (oxalate, mainly) and reductive gas such as hydrogen; a method for obtaining Fe or Fe—Co particles by reducing iron oxide with reductive gas such as hydrogen; a method for thermally decomposing metal carbonyl compounds; a method for reduction by adding reducing agents such as sodium boron hydride, hypophosphite, or hydrazine to a ferromagnetic metal solution; and a method for obtaining a micro powder by evaporating metal in low-pressure inert gas or the like. The ferromagnetic metal powder thus obtained can be used after subjected to any of the publicly known slow oxidation treatment methods, that is, a method of dipping the powder in an organic solvent before dried, a method of dipping the powder in an organic solvent, feeding thereafter an oxygen-containing gas to form an oxide film on the surface of each particle, and drying the particle, and a method of adjusting partial pressures of an oxygen gas and an inert gas, without using an organic solvent, to form an oxide coating film on the surface of the powder.

A specific surface area by BET method of the ferromagnetic metal powder used in the magnetic layer of the present invention is preferably selected from 30 to 50 m$^2$/g. With this, good surface property and low noises are compatible.

In addition, as a shape of the ferromagnetic metal powder, an acicular shape, especially a flat acicular shape is preferable, but a granulated shape, a rice grain shape, and a plate shape are allowable.

A mean length of the major axis of the particle of the ferromagnetic metal powder is preferably from 0.05 to 0.15 μm, further preferably from 0.08 to 0.12 μm.

The length of the major axis is given by suitably combining methods such as a method of photographing a transmission electron microscope photograph and directly reading, from the photograph, a length of the minor axis and a length of the major axis of the particle of the ferromagnetic powder and a method of reading the length of the minor axis and the length of the major axis by tracing a transmission electron microscope photograph with the use of an image analyzing apparatus, IBASSI, manufactured by Carl Zeiss.

An acicular ratio of the ferromagnetic metal powder is preferably from 4 or higher to 18 or less, further preferably from 5 or higher to 12 or less. A moisture content of the ferromagnetic metal powder is preferably from 0.01 to 2%, and the moisture content is preferably optimized depending on the kinds of the binders.

It is preferable to optimize pH of the ferromagnetic metal powder by combination with a binder to be used, and the pH range is from 4 to 12, but preferably from 7 to 10. The ferromagnetic metal powder may have, on the particle surface, Al, Si, P, those oxides, or the like if necessary, and the amount is from 0.1 to 10% by weight with respect to ferromagnetic metal powder, and it is preferred because, when the surface treatment is made, absorption of a lubricant such as fatty acid becomes equal to or less than 100 mg/m$^2$. Although the ferromagnetic metal powder might contain an inorganic ion such as soluble Na, Ca, Fe, Ni or Sr, the characteristics are slightly affected as long as it is equal to or less than 200 ppm.

The ferromagnetic metal powder used in the present invention preferably has fewer voids, and the value of the voids is equal to or less than 20% by volume, further preferably equal to or less than 5% by volume.

Next, detailed description of the nonmagnetic layer used in the preferable embodiments of the present invention will be made. Nonmagnetic inorganic powder used in the nonmagnetic layer according to the invention may be selected from such inorganic compounds as metal oxide, metal carbonate, metal sulfate, metal nitride, metal carbide and metal sulfide. The inorganic compounds include, for example, α-alumina having an α-conversion rate equal to or higher than 90%, β-alumina, γ-alumina, θ-alumina, silicon carbide, chromium oxide, cerium oxide, α-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide, and these can be used alone or in combination. Especially preferable are titanium dioxide, zinc oxide, iron oxide, and barium sulfate, and further preferable are titanium dioxide and a-iron oxide.

The particle size of these nonmagnetic inorganic powders is preferably equal to or less than 3 μm, but the same effect can be obtained by combining nonmagnetic inorganic powders having different particle sizes, or by widening, even with one kind of the nonmagnetic inorganic powder, the particle diameter distribution, if necessary. As the particle size of the nonmagnetic inorganic powder, particularly preferable is from 0.01 μm to 0.2 μm. Especially, when the nonmagnetic inorganic powder is granulated metal oxide, the average particle size is preferably equal to or less than 0.08 μm; when the powder is acicular metal oxide, the length of the major axis is preferably equal to or less than 0.3 μm, more preferably equal to or less than 0.2 μu m. It is to be noted that measurement of the particle size of the nonmagnetic inorganic powder is the same as that of the ferromagnetic metal powder as mentioned above. The tap density is from 0.05 to 2 g/ml, preferably from 0.2 to 1.5 g/ml. The moisture content of the nonmagnetic inorganic powder is from 0.1 to 5% by weight, preferably from 0.2 to 3% by weight, further preferably from 0.3 to 1.5% by weight. The pH of the nonmagnetic inorganic powder is from 2 to 11, but especially preferable is pH between 7 and 10. The specific surface area of the nonmagnetic inorganic powder is from 1 to 100 m$^2$/g, preferably from 5 to 70 m$^2$/g, more preferably from 10 to 65 m$^2$/g. The crystallite size of the nonmagnetic inorganic powder is preferably from 0.004 μm to 1 μm, further preferably from 0.04μm to 0.1 μm. The oil absorption amount utilizing dibutyl phthalate (DBP) is from 5 to 100 ml/100 g, preferably from 10 to 80 ml/100 g, and further preferably from 20 to 60 ml/100 g. The specific gravity is from 1 to 12, preferably from 3 to 6. The shape may be any one of an acicular shape, sphere shape, polygon shape, and plate shape.

It is considered that the ignition loss is preferably equal to or less than 20% by weight, but originally, the most preferable is zero. The aforementioned nonmagnetic inorganic powder used in the present invention has the Mohs' scale of hardness of from 4 to 10. The roughness factor of the powder surface is preferably from 0.8 to 1.5, and more preferably, the roughness factor is from 0.9 to 1.2. The absorption amount of SA (stearic acid) of the nonmagnetic inorganic powder is from 1 to 20 μmol/m$^2$, preferably from 2 to 15 μmol/m$^2$. The wetting heat to water at 25° C. in the nonmagnetic inorganic powder is preferably in the range of from 200 erg/cm$^2$ to 600 erg/cm$^2$. Also, a solvent having the wetting heat in this range can be used. The water molecule amount of the surface is adequately from 1 to 10 pieces/100 angstroms at 100 to 400° C. The pH at the isoelectric point in water is preferably between 3 and 9.

These nonmagnetic inorganic powders are preferably subjected to surface treatment to form at least a part of the surface covered with $Al_2O_3$, $SiO_2$, $TiO_2$, $ZrO_2$, $SnO_2$, $Sb_2O_3$ or ZnO. In respect of dispersibility, especially preferable are $Al_2O_3$, $SiO_2$, $TiO_2$, $ZrO_2$, and further preferable are $Al_2O_3$, $SiO_2$, $ZrO_2$. These may be used either in combination or alone. Moreover, a surface-treated layer prepared by coprecipitation may be used in view of the purpose. Such a method may be used as to coat alumina on the surface, followed by coating silica and vice versa. With respect to the surface-treated layer, a porous layer maybe used according to the purpose, but such a layer is generally preferable as being homogeneous and dense.

The specific examples of the nonmagnetic inorganic powders used in the nonmagnetic layer of the invention include Nanotite manufactured by Showa Denko K. K., HIT-100 and ZA-G1 manufactured by Sumitomo Chemical Co. Ltd., DPN-250, DPN-250BX, DPN-245, DPN-270BX, DPB-550BX, and DPN-550RX manufactured by Toda Kogyo Corporation, titanium oxide TTO-51B, TTO-55A, TTO- 55B, TTO-55C, TTO-55S, TTO-55D, SN-100, MJ-7 α-iron oxide E270, E271, and E300 manufactured by Ishihara Sangyo Co., Ltd., STT-4D, STT-30D, STT-30, and STT-65C manufactured by Titan Kogyo K. K., MT-100S, MT-100T, MT-150W, MT-500BMT-600BMT-100F, and MT-500HD manufactured by Tayca Corporation. Also, FINEX-25, BF-1, BF-10, BF-20 and ST-M manufactured by Sakai Chemical Industry Co., Ltd. , DEFIC-Y, and DEFIC-R manufactured by Dowa Mining Co., Ltd., AS2BM, and TiO2P25 manufactured by Nippon Aerosil Co., Ltd., 100A and 500A manufactured by Ube Industries, Ltd., and Y-LOP manufactured by Titan Kogyo K. K. , and sintered products thereof can be exemplified.

Particularly preferable as the nonmagnetic inorganic powder are titanium dioxide and α-iron oxide. The α-iron oxide (hematite) is prepared under following conditions. The α-$Fe_2O_3$ powder uses acicular goethite particles as precursor particles , the acicular goethite particle obtained by the following general methods; (1) a method for generating acicular goethite particles by conducting oxidation reaction by aerating a suspension with an oxygen-containing gas under a pH equal to or higher than 11, at a temperature equal to or less than 80° C., where the suspension contains ferrous hydroxide colloid obtained by adding a ferrous aqueous solution with the equivalent or more of an aqueous solution of alkali hydroxide; (2) a method for generating spindle-shaped goethite particles by conducting oxidation reaction by aerating a suspension with an oxygen-containing gas, where the suspension contains $FeCO_3$ obtained by reacting an aqueous solution of ferrous salt with an aqueous solution of alkali carbonate; (3) a method for generating acicular goethite nucleus particles by conducting oxidation reaction by aerating an aqueous solution of ferrous salt with an oxygen-containing gas, where the aqueous solution of ferrous salt contains ferrous hydroxide colloid hydroxide obtained by adding a ferrous aqueous solution with less than equivalent of an aqueous solution of alkali hydroxide or an aqueous solution of alkali carbonate, and then growing the acicular goethite nucleus particles by adding the aqueous solution of ferrous salt containing the acicular goethite nucleus particles with the equivalent or more (with respect to $Fe^{2+}$) of an aqueous solution of alkali hydroxide in the aqueous solution of ferrous salt followed by aeration with the oxygen-containing gas; and (4) a method for generating acicular goethite nucleus particles by conducting oxidation reaction by aerating an aqueous solution of ferrous salt with an oxygen-containing gas where the aqueous solution of ferrous salt contains ferrous hydroxide colloid obtained by adding a ferrous aqueous solution with less than equivalent of an aqueous solution of alkali hydroxide or an aqueous solution of alkali carbonate, and then growing the acicular goethite nucleus particles in an acid or a neutral area.

It is to be noted that no obstructions occur if heterogeneous elements such as Ni, Zn, P, Si or the like, which are generally added during the generating reaction of the goethite particles for improving characteristics of the particle powder or the like, are added.

The acicular goethite particles as precursor particles are dehydrated at a temperature in the range of from 200 to 500° C., or further subjected, if necessary, to annealing through a heating treatment at a temperature in the range of from 350 to 800° C., thus to obtain acicular α-$Fe_2O_3$ particles.

It is to be noted that no obstructions occur if the acicular goethite particles to be subjected to dehydration or annealing are adhered with, as an anti-sintering agent, a compound containing P, Si, B, Zr, Sb or the like on its surface.

The reason why the annealing by the heat treatment at a temperature in the range of from 350 to 800° C. is conducted is that it is preferable to melt, through annealing, the utmost surface of the particle to make voids filled, the voids being generated at the particle surface of the acicular α-$Fe_2O_3$ particle obtained by dehydration, thus to provide a smooth surface configuration.

In addition, the acicular α-$Fe_2O_3$ particles thus obtained through hydration or annealing are dispersed in an aqueous solution to obtain a suspension, and after, for example, adding an Al compound and adjusting pH, the surface of said α-$Fe_2O_3$ particles are coated with the Al compound. Then, treatments such as filtration, rinsing, drying, grinding and, if necessary, further deaeration and compaction or the like may be performed. Concerning the Al compound to be used, usable is an aluminum salt such as aluminum acetate, aluminum sulfate, aluminum chloride, aluminum nitrate or the like, or alkali aluminate such as soda aluminate or the like. The amount of Al compound to be added in this case is normally from 0.01 to 50% by weight with respect to the powder of α-$Fe_2O_3$ in terms of Al. The particles can be coated, together with the Al compound, by an Si compound, or one or more compounds selected from P, Ti, Mn, Ni, Zn, Zr, Sn, and Sb. The respective added amount of these compounds to be used with the Al compound is generally in the range of from 0.01 to 50% by weight with respect to the α-$Fe_2O_3$ powder.

Method for manufacturing the titanium dioxide will be described hereinafter. Manufacturing titanium dioxide can be mainly accomplished by a sulfuric acid method and a chlorine method. In the sulfuric acid method, ilmenite ore is digested with sulfuric acid to extract Ti, Fe and the like as sulfates. The iron sulfate is crystallized and separated, thus to be removed, and then the residual titanyl sulfate solution is purified by filtration, and then thermally hydrolyzed to cause hydrous titanium oxide to be deposited. After filtering and washing the hydrous titanium oxide, the mixed impurities are removed by washing, and then the hydrous titanium oxide after added with a particle diameter adjuster or the like is then subjected to a sintering process at 800° C. to 1000° C., thereby producing coarse titanium oxide. The type is classified into a rutile type and an anatase type according to the kind of a nucleus agent which is added on hydrolyzation. The coarse titanium oxide is subjected to crashing, sizing, surface treatments or the like for manufacturing. In the chlorine method, on the other hand, natural rutile or synthetic rutile is used as the ore. The ore is chlorinated in a high temperature reduced condition so that Ti is converted to $TiCl_4$ and Fe is converted to $FeCl_2$. The iron oxide solidified by a cooling process is then separated from liquid of $TiCl_4$. The coarse $TiCl_4$ thus obtained is refined by rectification, and it is added with a nucleating agent and then reacted momentarily with oxygen at the temperature equal to or higher than 100° C., thereby producing coarse titanium oxide. The method of a finishing treatment to provide the coarse titanium oxide thus generated in this oxidative decomposition process with the pigmentary characteristics is the same as that in the sulfuric acid method.

The surface treatment is carried out, after dry ground process of said titanium oxide, as to add water and a dispersant, followed by classification of the coarse particles by wet ground process and centrifugation. Then, the micro particle slurry is transferred into a surface treatment tank, where the surface of the metal hydroxide is coated. First, an aqueous solution of salts such as Al, Si, Ti, Zr, Sb, Sn, Zn or the like with a predetermined amount is added, and then the acid or alkali for neutralizing the solution is also added, thus to generate a hydrous oxide with which the surfaces of the particles of the titanium oxide are coated. The by-product water-soluble salts are removed by decantation, filtration and washing, and finally, the pH of the slurry is adjusted and the slurry is filtered and then rinsed with pure water. A cake after washed is then dried with a spray drier or a band drier. As a final step, this dried material is ground by a jet mill to become products. Instead of being treated in an aqueous system, it is also possible to perform the surface treatment bypassing vapor of $AlCl_3$, $SiC_4$ through the titanium oxide powder, and then by introducing water vapor thereinto. As for other methods for manufacturing the pigments, "Characterization of Powder Surfaces" G. D. Parfitt and K. S. W. Sing, published by Academic Press, 1976 can be referred to.

When carbon black is contained in the nonmagnetic layer, not only the Rs can be reduced and the light transmittance can be small, as publicly known effects, but also a desired micro Vickers hardness can be obtained.

The micro Vickers hardness of the nonmagnetic layer is normally from 25 to 60 $Kg/mm^2$, preferably from 30 to 50 $Kg/mm^2$, measured with a thin film durometer HMA-400 manufactured by NEC using, at a pad tip, a triangular pyramid probe made of diamond with a ridge degree of 80 and a tip radius of 0.1 $\mu m$. As for the light transmittance, it is standardized that an absorption of infrared rays in the wavelength of around 900 nm is normally equal to or less than 3%; for example, in the case of VHS, it is equal to or less than 0.8%. For this, furnace black for rubbers, thermal for rubbers, black for coloring, acetylene black or the like can be utilized.

The carbon black contained in the nonmagnetic layer has the specific surface area of, normally, from 100 to 500 $m^2/g$, preferably from 150 to 400 $m^2/g$, the DBP oil absorption amount of, normally, from 20 to 400 ml/100 g, preferably from 30 to 200 ml/100 g. The particle size of carbon black is normally from 5 nm to 80 nm, preferably from 10 to 50 nm, further preferably from 10 to 40 nm. Generally, it is preferable for carbon black to have a pH of from 2 to 10, a moisture content of from 0.1 to 10%, and a tap density of from 0.1 to 1 g/ml. Specific examples of carbon blacks for use in this invention include BLACK PEARLS 2000, 1300, 1000, 900, 800, 880, 700, and VULCAN XC-72 manufactured by Cabot Corporation; #3050B, 3150B, 3250B, #3750B, #3950B, #950, #650B, #970B, and #850BMA-600, manufactured by Mitsubishi Chemical Corp.; CONDUCTEX SC, RAVEN 8800, 8000, 7000, 5750, 5250, 3500, 2100, 2000, 1800, 1500, 1255, and 1250 manufactured by Columbia Carbon Co. Ltd.; and Ketjen black EC manufactured by Lion Akzo Co., Ltd. These carbon blacks maybe ones surface-treated with a dispersant or grafted with resin, and ones whose surface has been partly graphitezed. Further, before added to a coating liquid, the carbon black may be dispersed in advance into the binder. These carbon blacks can be used within the range of less than 50% by weight with respect to said inorganic powder and within the range of less than 40% by weight with respect to the total weight of the nonmagnetic layer. These carbon blacks can be used alone or in combination.

As for the carbon blacks usable in the nonmagnetic layer, for example, "Carbon Black Binran " edited by Carbon Black Association can be referred.

In addition, the nonmagnetic layer can be added with organic powder according to the purpose. For example, acryl styrene based resin powder, benzoguanamine resin powder, melamine based resin powder, and phthalocyanine based pigment can be exemplified, but followings can be used such as polyolefin based resin powder, polyester based resin powder, polyamide based resin powder, polyimide based resin powder, and a polyfluorethylene resin. As the method for manufacturing those above, methods described in Japanese Unexamined Patent Publication (KOKAI) Showa No. 62-18564, Japanese Unexamined Patent Publication (KOKAI) Showa No. 60-255827, or the like can be used.

An undercoat layer is formed in the ordinary magnetic recording medium for the purpose of improving adhesive force between the support and the magnetic layer or the nonmagnetic layer where solvent-soluble polyester is used and the thickness is normally equal to or less than 0.5 $\mu m$.

The binder resins, lubricants, dispersants, additives, solvents, dispersing methods and others used in the nonmagnetic layer can apply those used in the magnetic layer. In particular, publicly known techniques for magnetic layer can be applied to those relating to the binder resin amounts, the kinds, additives, the added amounts of the dispersants, and the kinds.

As for thermoplastic resins usable in the magnetic layer and the nonmagnetic layer, it is preferable to have the glass transition temperature of from −100 to 150° C., the number average molecular weight of from 1000 to 200000, preferably from 10000 to 100000, the polymerization degree of about from 50 to 1000. Examples thereof include polymers or copolymers containing the following compounds as a constituting unit, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber based resins.

In addition, examples of thermosetting resins or reactive type resins include phenol resins, epoxy resins, polyurethane thermosetting type resins, urea resins, melamine resins, alkyd resins, acrylic based reactive resins, formaldehyde resins, silicone resins, epoxy-polyamide resins, a mixture of polyester resin and isocyanate pre-polymer, a mixtures of polyesterpolyol and polyisocyanate, a mixture of polyurethane and polyisocyanate and the like. The details about these resins are described in "Plastic Handbook", published by Asakura Shoten. Moreover, publicly known electron radiation curing resins can be used in the nonmagnetic layer or in the magnetic layer.

The resins mentioned above can be used alone or in combination. As the preferred resins, a combination of polyurethane resins and at least one resin selected from vinyl chloride resins, vinyl chloride-vinyl acetate resins, vinyl chloride-vinyl acetate-vinyl alcohol resins, vinyl chloride-vinyl acetate-maleic anhydride copolymers, or these resins combined with polyisocyanate can be exemplified. As the structure of the polyurethane resin, publicly known resin such as polyester-polyurethane, polyether-polyurethane, polyether-polyester-polyurethane, polycarbonate-polyurethane, polyester-polycarbonate-polyurethane, polycaproractone-polyurethane, polyolefin-polyurethane or the like can be used. In particularly, aforementioned polyurethane constituted of a short-chain diol having a cyclic structure and a long-chain diol containing an ether group is preferred. With respect to all binders showed here, at least a polar group selected from —COOM, —$SO_3M$, —$OSO_3M$, —P=O(OM)$_2$, —O—P=O(OM)$_2$ (where M represents an hydrogen atom or an alkali metal base), —OH, —$NR_2$, =$N^+R_3$ (where R represents an hydrocarbon group), an epoxy group, —SH, —CN, sulfobetain, phosphobetain, carboxybetain or the like, introduced through copolymerization or addition reaction is preferably used, if necessary, to obtain further excellent dispersibility and durability. The amount of such polar groups is preferably from $10^{-1}$ to $10^{-8}$ mol/g, more preferably from $10^{-2}$ to $10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corporation; MPR-TA, MPR-TA5, MPR-TAL, MPR-TSN, MPR-TMF, MPR-TS, MPR-TM, and MPR-TAO manufactured by Nissin Kagaku Kogyo K. K.; 1000W, DX80, DX81, DX82, DX83, and 100FD manufactured by Denki Kagaku Kogyo K. K.; MR-104, MR-105, MR110, MR100, and 400X-110A manufactured by Nippon Zeon Co., Ltd.; Nippollan N2301, N2302, and N2304 manufactured by NIPPON POLYURETHANE Co., Ltd.; Pandex T-5105, T-R3080, T-5201, Burnock D-400, D-210-80, Crisvon 6109, and 7209 manufactured by Dainippon Ink And Chemicals, Incorporated.; Vylon UR8200, UR8300, RV530, and RV280 manufactured by Toyobo Co., Ltd.; Daipheramine 4020, 5020, 5100, 5300, 9020, 9022, and 7020 manufactured by Dainichiseika Color & Chemicals Mfg. Co., Ltd.; MX 5004 manufactured by Mitsubishi Kasei Corporation; Sunprene SP-150, and TIM-3003 manufactured by Sanyo Chemical Industries Co., Ltd.; Salan F310 and F210 manufactured by Asahi Chemical Industry Co., Ltd., and the like. Among those above, preferable are MR-104, MR110, UR-8200, UR8300 and UR-8700, and also a polyurethane as a reaction product having diol and organic diisocyanate as a main raw material as well as having a cyclic structure and an ether group is preferable.

In the case where polyurethane is used in the present invention, it is preferred that the elongation at break is from 100 to 2000%, the stress at break is from 0.05 to 10 Kg/cm$^2$, and the yield point is from 0.05 to 10 Kg/cm$^2$.

As for isocyanates used in the present invention, isosyanates such as tolylene diisocyanate, 4,4'-diphenylmethane diisosyanate, hexamethylene diisocyanate, xylylene diisosyanate, naphtylene-1, 5-diisosyanate, o-toluidine diisosyanate, isophorone diisocyanate, triphenylmethane triisocyanate or the like, products of these isocyanates with polyalcohols, or polyisocyanates producted by condensation of isocyanates are preferable. These isocyanates are commercially available under the following trade names; Coronate L, Coronate HL, Coronate 2030, Coronate 2031, Millionate MR, and Millionate MTL manufactured by Nippon Polyurethane Co. Ltd.; Takenate D-102, Takenate D-110N, Takenate D-200, and Takenate D-202 manufactured by Takeda Chemical Industries Co.Ltd.; Desmodule L, Desmodule IL, Desmodule N, and Desmodule HL manufactured by Sumitomo Bayer Co. Ctd., and so on. For both the nonmagnetic layer and the magnetic layer, these can be used alone, or in combination of two or more by taking advantage of a difference in curing reactivity.

These polyisocyanates are used normally in the range of from 0 to 50% by weight, preferably from 0 to 30% by weight with respect to the total binder resin of the magnetic layer; these polyisocyanates are used normally in the range of from 0 to 40% by weight, preferably from 0 to 25% by weight with respect to the total binder resin of the nonmagnetic layer.

In the case where the magnetic recording medium of the present invention is constituted of two or more layers, as a matter of course, the binder resin amount, the amounts of vinyl chloride based resin, polyurethane resin, polyisocyanate or other resin in the binder, the molecular weight of each resin which forms the magnetic layer, the amount of the polar group, the aforementioned physical properties of the resin or the like can be varied, if necessary, between the nonmagnetic layer and the magnetic layer. Also, publicly known techniques relating to multilayer magnetic layers are applicable.

The carbon blacks exemplified in the nonmagnetic layer are also applicable to the magnetic layer of the present invention.

Before added to a magnetic paint, the carbon black may be dispersed into a binder in advance. These carbon blacks can be used either alone or in combination. In the case of using the carbon black, it is preferable to use the carbon black in an amount of from 0.1 to 10% by weight, preferably from 0.1 to 3% by weight, further preferably from 0.5 to 1.5% by weight with respect to the amount of a ferromagnetic metal powder. The carbon black has functions in the magnetic layer to prevent static buildup, to reduce the friction coefficient, to lessen light-transmittance, or to improve strength for coating. These effects are different depending on kinds of carbon black. Therefore, it is, as a matter of course, possible in the invention to properly use carbon black different in kinds, amount and combination, according to the purpose, between the magnetic layer and the nonmagnetic layer depending on the mentioned properties such as particle size, oil absorption amount, electrical conductivity, pH or the like. As for the examples of the carbon black usable in the invention, "Carbon Black Binran (Carbon Black Handbook)" edited by Carbon Black Association, for example, can be referred.

As for the abrasives used in the present invention, publicly known materials having 6 or higher on Mohs' scale can be used alone or in combination; for example, α-alumina having an α-conversion rate equal to or higher than 90%, β-alumina, silicon carbide, chromium oxide, cerium oxide, β-iron oxide, corundum, artificial diamond, silicon nitride, titanium carbide, titanium dioxide, silicon dioxide, and boron nitride. A composite composed of two or more of these abrasives (e.g., one obtained by surface-treating one abrasive with another) may also be used. Although these abrasives may contain compounds or elements other than the main component in some cases, the same effect is obtainable if the content of the main component is equal to or higher than 90% by weight. The particle size of these abrasives is preferably from 0.01 to 2 μm. However, the same effect is given by combining abrasives different in particle size or enhancing the distribution of the particle size even in the case of using the abrasive alone. The abrasive preferably has a tap density of from 0.3 to 2 g/cc, a moisture content of from 0.1 to 5%, a pH of from 2 to 11, and a specific surface area of from 1 to 30 m$^2$/g.

Although the particles of the abrasives used in the present invention may have any of an acicular, spherical, and cubical shape, particles having corners on the part of the shape is preferred because of its good abrasive property. Specific examples of the abrasive used in the present invention include AKP-20, AKP-30, AKP-50, HIT-50, HIT-60A, HIT-70, HIT-80, HIT-80G, and HIT-100 manufactured by Sumitomo Chemical Co., Ltd.; G5, G7, and S-1 manufactured by Nippon Chemical Industrial Co., Ltd.; and TF-100, and TF-140 manufactured by Toda Kogyo K. K, and the like. It is, as a matter of course, possible in the invention to properly use abrasives different in kinds, amount and combination, according to the purpose, between the magnetic layer and the nonmagnetic layer. These abrasives may be added into the magnetic paints after dispersing treatment in advance with the binder. The number of the abrasive particles existing on the surface and the side faces of the magnetic layer of the magnetic recording medium of the present invention is preferably equal to or higher than 5 pieces/100 $\mu m^2$.

As the additives used in the present invention, the additives having the lubricating effects, the antistatic effects, the dispersing effects, the plasticizing effects, or the like, are used. Examples of the additives include molybdenum disulfide; tungsten graphite disulfide; boron nitride; graphite fluoride; a silicone oil ; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having a carbon number of 10 to 24 which may contain an unsaturated bond or bonds or may be branched and their metal salts(e.g., Li, Na, K, Cu); monohydric, dihydric, trihydric, tetrahydric, pentahydric and hexahydric alcohols having a carbon number of 12 to 22 which may contain an unsaturated bond or bonds or maybe branched; alkoxy alcohols having a carbon number of 12 to 22 which may contain an unsaturated bond or bonds or may be branched; monofatty acid esters, difatty acid esters, or trifatty acid esters comprising any of monobasic fatty acids having a carbon number of 10 to 24 which may contain an unsaturated bond or bonds or may be branched; and monohydric, dihydric, trihydric, tetrahydric, pentahydric and hexahydric alcohols having a carbon number of 2 to 12 which may contain an unsaturated bond or bonds or to be branched; fatty acid esters of a monoalkyl ethers of alkylene oxide polymerized products; fatty acid amides having a carbon number of 8 to 22; and aliphatic amines having a carbon number of 8 to 22.

Specifically, examples of the additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. It is also possible to use nonionic surfactants, such as alkylene oxide based, glycerin based, glycidol based, and alkylphenolethylene oxide adducts; cationic surfactants, such as cyclic amines, ester amides, quaternary ammonium salts, hydantoin derivatives, heterocycles, phosphoniums or sulfoniums; anionic surfactants containing acidic groups, such as carboxylic acid, sulfonic acid, phosphoric acid, sulfuric ester group and a phosphoric ester group; and ampholytic surfactants, such as amino acids, amino sulfonic acids, sulfuric or phosphoric esters of amino alcohols and alkyl betaine type. Details of these surfactants are described in, for example, "A Guide to Surfactants" published by Sangyo Tosho Co. Ltd.). The lubricants, the antistatic agents and the like, need not be 100% pure but may contain impurities, such as isomers, unreacted materials, side reaction products, decomposition products and oxides in addition to the main components. The content of these impurities is preferably equal to or less than 30% by weight, more preferably equal to or less than 10% by weight.

These lubricants and surfactants usable in the present invention may be different in kinds and amount between the nonmagnetic powder and the magnetic powder according to the purpose. It is conceivable, for example, to control bleeding on the surface with use of fatty acids having different melting points between the nonmagnetic layer and the magnetic layer, to control bleeding on the surface with use of esters having different boiling points and polarities, to improve the coating stability by adjusting the amount of surfactants, to improve the lubricant effects by increasing the amount of the lubricants added to the nonmagnetic layer or the like. Such designing is not limited to the above examples as a matter of course.

All or some of the additives used in the present invention may be added at any stage of the manufacturing process for the magnetic paint; for example, they may be mixed with the ferromagnetic metal powder before a kneading step; added at a kneading step for kneading the ferromagnetic metal powder, the binder, and the solvent; added at a dispersing step; added after dispersing; or added immediately before coating. The purpose may be accomplished by coating a part or all of the additives by simultaneous or sequential coating, after the magnetic coated layer is coated in accordance with the purpose. The lubricants may be coated on the surface of the magnetic layer depending on the purpose, after calendar processing or making slits.

The lubricants usable in the present invention are available under the trade names of, for example, NAA-102, NAA-415, NAA-312, NAA-160, NAA-180, NAA-174 , NAA-175, NAA-222, NAA-34, NAA-35, NAA-171, NAA-122, NAA-142, NAA-160, NAA-173K, hydrogenated castor oil fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221 Monogly MB, Nonion DS-60, Anon BF, Anon LG, Butyl Stearate, Butyl Laurate, and Erucic Acid manufactured by NOF corp.; Oleic Acid manufactured by Kanto Chemical Co., Ltd; FAL-205 and FAL-123 manufactured by Takemoto Yushi K. K.; NJLUB LO, NJLUB IPM, and Sansosyzer E4030 manufactured by New Japan Chemical Co. , Ltd. ; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-2-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Armour Co., Ltd.; Duomine TDO manufactured by Lion Corp.; BA-41G manufactured by Nisshin Oil Mills, Ltd.; Profan 2012E, Newpole PE61, Ionet MS-400, Ionet MO-200, Ionet DL-200, Ionet DS-300, Ionet DS-1000, and Ionet DO-200 manufactured by Sanyo Chemical Industries Ltd.

Organic solvents may be used at the optional ratio in the present invention. Examples of the organic solvents include ketones, such as acetone, methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ether based, such as glycol dimethyl ether, glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; N, N-dimethylformamide; dimethylacetamide; and hexane. The organic solvents need not be 100% pure but may contain impurities, such as isomers, unreacted materials, side reaction products, decomposition products, oxides, and moisture in addition to the main components. The content of these impurities is preferably equal to or less than 30% by weight, more preferably equal to or less than 10% by weight. As for the organic solvents used in the present invention, preferably the same kinds are used in the magnetic layer and the nonmagnetic layer, but the adding amount may be changed between the magnetic layer and the nonmagnetic layer. It is adequate to raise the stability of coating, in the nonmagnetic layer, using a solvent having a high surface tension, (e.g., cyclohexane, dioxane or the like). More specifically, it is important to design that the arithmetic mean value of the magnetic layer solvent compositions is not less than the arithmetic mean value of the nonmagnetic layer solvent compositions. To improve the dispersibility, a solvent having a strong polarity to some extent is preferred. It is also preferable that the content of the solvent having a permittivity in the range of from 15 to 20 is equal to or higher than 50% in the solvent compositions. The dissolution parameter is preferably from 8 to 11.

The thickness structure of the magnetic recording medium according to the present invention has the support having a thickness of from 1 to 100 μm, and it is particularly effective when the thin support having a thickness of from 1 to 8 μm is used.

The total thickness of the magnetic layer and the nonmagnetic layer for use is in the range of from 1/100 to 2 times as thick as the thickness of the support. In addition, an adhesive layer may be preferably formed between the support and the nonmagnetic layer to improve adhesion thereof.

The thickness of the adhesive layer is from 0.01 to 2 μm, preferably from 0.02 to 0.5 μm. A back coating layer may be formed on the surface of the support on the side opposite to the magnetic layer. The thickness of the back coating layer is from 0.1 to 2 μm, preferably from 0.3 to 1.0 μm. As the materials for the adhesive layer and the back coating layer, any of publicly known materials may be utilized.

The support usable in the present invention is a support having a micro Vickers hardness equal to or higher than 75 Kg/mm$^2$ and publicly known films subjected to biaxial stretching can be used, such as polyethylene naphthalate, polyamide, polyimide, polyamide-imide, aromatic polyamide, polybenzoxidazole and the like. In particular, the support is preferably constituted of an aromatic polyamide or polyethylene naphthalate available under the names of "Aramid" manufactured by Toray Industries, Inc. or "Aramica" manufactured by Asahi Chemical Industry Co., Ltd.

These supports may be subjected beforehand to corona discharge treatment, plasma treatment, treatment for enhancing adhesion, heat treatment, dust removal or the like. In order to achieve the object of the invention, such a support is preferably used as having a plane coated with a magnetic layer in which a centerline average surface roughness of from 10 nm to 0.1 nm, preferably from 6 nm to 0.2 nm, further preferably from 4 nm to 0.5 nm. It is preferable not only that the centerline average surface roughness is small, but also that there is no coarse projection equal to or larger than 1 μm. In addition, the configuration of the surface roughness can be freely controlled, if necessary, by the size and the amount of fillers added to the support. Examples of the fillers include oxides and carbonates of Al, Ca, Si, Ti or the like, which may be crystalline or amorphous. Moreover, micro organic powders, such as acrylic based and melamine based are also exemplified. In order for the running durability to be compatible, the roughness of the plane coated with the back coating layer is preferably bigger than the roughness of the surface coated with the magnetic layer. The centerline surface roughness of the plane coated with the back coating layer is preferably from 1 nm to 20 nm, further preferably from 2 nm to 8 nm. When the roughness is changed between the plane coated with the magnetic layer and the plane coated with the back coating layer, a support having a dual structure may be used, or a coating layer may be provided.

As for the support used in the present invention, it is general that a F-5 value in the tape running direction is preferably from 10 to 50 kg/mm$^2$, a F-5 value in the tape width direction is preferably from 10 to 30 kg/mm$^2$, and the F-5 value in the tape longitudinal direction is higher than that in the tape width direction, but it is not being limited if it is necessary that the strength, especially, in the width direction is enhanced. The thermal shrinkage of the support in the tape running direction and in the tape width direction at 100° C. for 30 minutes is preferably equal to or less than 3%, more preferably equal to or less than 1.5%, and the thermal shrinkage at 80° C. for 30 minutes is preferably equal to or less than 1%, more preferably equal to or less than 0.5%. It is preferable that the break strength in the both directions is preferably from 5 to 100 kg/mm$^2$ and the modulus of elasticity is preferably from 100 to 2,000 kg/mm$^2$. Moreover, the light-transmittance at the wavelength of 900 nm in the present invention is preferably equal to or less than 30%, more preferably equal to or less than 3%.

The process for producing the magnetic paints for the magnetic recording medium of the present invention includes steps at least a kneading step, a dispersing step, and a mixing step to be carried out, if necessary, before or after these steps. The individual step may be performed separately at two or more stages. All of the starting materials to be used in the invention, including the ferromagnetic powder, binders, carbon black, abrasives, antistatic agents, lubricants, solvents and so on, may be added at the beginning of or during any of the steps. Moreover, the individual material may be divided and added in two or more steps; for example, polyurethane may be divided and added in the kneading step, the dispersing step, and the mixing step for viscosity adjustment after dispersing. In order to accomplish the purpose of the present invention, a conventional publicly known manufacturing technique may be utilized as a part of the process, as a matter of course. In addition, in the kneading process, it is preferable to use a kneader having a strong kneading force, such as a continuous kneader or a pressure kneader, since using those kneaders can provide a high Br. In the case where the continuous kneader or the pressure kneader is used, the ferromagnetic metal powder and all or part of the binder (preferably, equal to or higher than 30% by weight of the entire binder) are kneaded in the range of from 15 to 500 parts with respect to 100 parts of the ferromagnetic metal powder. Details of the kneading treatment are described in Japanese Unexamined Patent Publication (KOKAI) Heisei No. 1-166338 and Japanese Unexamined Patent Publication (KOKAI) Showa No. 64-79274. In the case where the magnetic layer liquid, the nonmagnetic layer liquid, the abrasive dispersing liquid or the like is prepared, a dispersing medium having a high specific gravity is desirably utilized, preferably, zirconia beads.

By way of examples, the followings can be proposed as coating apparatuses and methods for carrying out the simultaneous multilayer coating to form the magnetic recording medium having a multilayer structure of the present invention.

1. A nonmagnetic layer coated layer is first applied with a coating apparatus commonly used for magnetic paint coating, e.g., a gravure coating, roller coating, blade coating, or extrusion coating apparatus, and an upper layer is then applied, while the nonmagnetic coated layer is still in a wet state, by means of a support-pressing extrusion coating apparatus such as those disclosed in Japanese Patent Publication (KOKOKU) Heisei No. 1-46,186, Japanese Unexamined Patent Publication (KOKAI) Showa No. 60-238,179 and Japanese Unexamined Patent Publication (KOKAI) Heisei No. 2-265,672.

2. An upper nonmagnetic layer is applied almost simultaneously using a single coating head having two built-in slits for passing coating liquids, such as those disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672.

3. An upper nonmagnetic layer is applied almost simultaneously using an extrusion coating apparatus with a backup roller as disclosed in Japanese Unexamined Patent Publication (KOKAI) Heisei No. 2-174965.

It is to be noted that, in order to prevent lowering the electromagnetic characteristics or the like of the magnetic recording medium by aggregation of ferromagnetic particles, shearing may preferably apply to the coating liquid in the coating head by a method such as those disclosed in U.S. Pat. No. 4,828,779 and Japanese Unexamined Patent Publication (KOKAI) Heisei No. 1-236,968. In addition, the viscosity of the coating liquid preferably satisfies the numerical range as specified in Japanese Unexamined Patent Publication (KOKAI) Heisei No. 3-8,471.

A strong orientation is preferably carried out in order to obtain the magnetic recording medium of the present invention. In the case of the magnetic tape, the orientation is carried out in a longitudinal direction. It is preferable to use a solenoid equal to or higher than 1,000 G, preferably equal to or higher than 3,000 G and a cobalt magnet in a manner that the same polarities of those above oppose to each other with the concurrent use of a magnetic field equal to or higher than 2,000 G, preferably equal to or higher than 4,000 G, further preferably equal to or higher than 6,000 G. Furthermore, it is preferable to set a proper drying process in advance before the orientation so that the post-dry orientation characteristics show the highest. In the case of the floppy disk, random orientation is taken. As for the orientating condition, the orientation in the tape longitudinal direction is carried out in the same way as that of the magnetic tape, and thereafter, the random orientation is carried out by passing through the disk in an alternating current magnetic field generator having two magnetic field intensities or the like of, for example, a magnetic field intensity of 250 gausses in a frequency of 50 Hz or a magnetic field intensity of 120 gausses in a frequency of 50 Hz.

Before the nonmagnetic layer and the magnetic layer are subjected to the simultaneous multilayer coating, it is preferred to provide an adhesive layer containing a polymer as a main component, or combine publicly known methods for enhancing the adhesiveness by carrying out corona discharge, ultraviolet radiation (UV) irradiation, or electron beam irradiation.

As the calendering treatment rolls, heat-resistant plastic rolls constituted of epoxy, polyimide, polyamide, polyimide-amide or the like, or metal rolls may be used. In addition, a pair of the metal rollers, a pair of the plastic rollers, or a pair of the metal roller and the plastic roller can be used for treatment. The treatment temperature is preferably from 70 to 120° C., further preferably from 80 to 100° C. or higher. The linear pressure is preferably from 200 to 500 Kg/cm, further preferably from 300 to 400 Kg/cm or higher.

The friction coefficient of the magnetic layer plane and the opposite plane of the magnetic recording medium of the present invention with respect to SUS420J is preferably from 0.1 to 0.5, further preferably from 0.2 to 0.3, the surface specific resistivity is preferably from $10^4$ to $10^{12}$ ohms/sq, the modulus of elasticity at 0.5% elongation of the magnetic layer in each of the running direction and the width direction is preferably from 100 to 2,000 Kg/mm$^2$, and the strength at break is preferably from 1 to 30 Kg/cm$^2$. The modulus of elasticity of the magnetic recording medium in each of the running direction and the width direction is preferably from 100 to 1,500 Kg/mm$^2$, the residual elongation is preferably equal to or less than 0.5%, the thermal shrinkage rate at any temperature of 100° C. or below is preferably equal to or less than 1%, more preferably equal to or less than 0.5%, the most preferably equal to or less than 0.1%, and ideally 0% The glass transition temperature (i.e., the temperature at which the loss elastic modulus in dynamic viscoelasticity measurement carried out at 110 Hz is maximum) of the magnetic layer is preferably from 30° C. to 150° C., and that of the nonmagnetic layer is preferably from 0° C. to 100° C. The loss elastic modulus is preferably in the range of from $1 \times 10^8$ to $8 \times 10^9$ dyne/cm$^2$, and the loss tangent is preferably equal to or less than 0.2.

An adhesion failure easily occurs due to excessive large loss tangent. The content of the residual solvent in the magnetic layer is preferably equal to or less than 100 mg/m$^2$, further preferably equal to or less than 10 mg/m$^2$. It is preferable that the content of the residual solvent in the magnetic layer is lower than that in the nonmagnetic layer. The void percentage in each of the nonmagnetic layer and the magnetic layer is preferably equal to or less than 30% by volume, further preferably equal to or less than 20% by volume. Although a lower void percentage is preferable for attaining higher output, there are some cases in which a certain degree of void percentage is preferably ensured according to the purpose; for example, in the case of a magnetic recording medium for data recording putting an importance on the repeating use, higher void percentage in most cases brings about better running durability. From the viewpoint of improving the calender molding property, the void percentage of the nonmagnetic layer and the magnetic layer of the sheet prior to the calendering treatment is respectively equal to or higher than 20% by volume, preferably equal to or higher than 40% by volume.

The magnetic characteristics of the magnetic recording medium of the present invention, that is, Hc and SFD as well as Bm and Br, are shown as values given by the measurement using a vibration sample type fluxmeter (VSM) under a magnetic field of 10 kOe in an in-plane direction of the magnetic layer, unless otherwise specified. In the case of the magnetic tape, an Hc in the tape running direction is already mentioned above, and a squareness (SQ) is normally equal to or higher than 0.85, preferably from 0.85 to 0.95. The squareness in the two directions perpendicular to the tape running direction, that is, the direction parallel to the tape plane as well as perpendicular to the tape running direction and the direction vertical to the tape plane is preferably equal to or less than 80% of the squareness in the running direction. A remanence coercive force Hr in a longitudinal direction is preferably from 1800 Oe to 3000 Oe. The Hc and the Hr in a vertical direction is preferably from 1000 Oe to 500 Oe.

A roughness of root mean square RRMS of the magnetic layer obtained from the evaluation by atomic Force micro Scope (AFM) is preferably in the range of from 2 nm to 15 nm.

The magnetic recording medium according to the present invention preferably comprises the nonmagnetic layer and the magnetic layer, but it will be easily presumed that the physical characteristics may be different between the nonmagnetic layer and the magnetic layer depending on the purpose. For example, the magnetic layer is made to have a high modulus of elasticity to improve running durability while, at the same time, the nonmagnetic layer is made to have a lower modulus of elasticity than that of the magnetic layer to have better head touching of the magnetic recording medium. Also, such a method can be effective in the present invention as the tensilizing method for the support is changed in order to improve the head touching. In many cases, good head touching is obtainable with the support tensilized in the direction perpendicular to the tape longitudinal direction.

EXAMPLES

The present invention is explained in detail by the following examples. "Parts" described in below represents "parts by weight", and % represents % by weight.

[Ferromagnetic Metal Powder]

The characteristics and compositions of the ferromagnetic metal powder used for manufacturing the magnetic recording medium will be shown in Table 1.

TABLE 1

Ferromagnetic powder

| Characteristics of ferromagnetic powder | Ferromagnetic metal powder A | Ferromagnetic metal powder B | Ferromagnetic metal powder C |
|---|---|---|---|
| Shape | | | |
| Particle shape | Spindle shaped acicular particle | Flat acicular particle | Flat acicular particle |
| Particle cross-section shape | Circular shape | Elliptical shape | Elliptical shape |
| Major axis length: μm | 0.11 | 0.10 | 0.125 |
| Minor axis length: μm (Longer width length) | 0.02 | 0.02 | 0.024 |
| Crystallite size: Å | 140 | 150 | 160 |
| Ratio of long width/short width of particle surface cross-sectioned | 1 | 2 | 2.4 |
| SBET (m$^2$/g) | 54 | 49 | 43 |
| Element composition (at %) | | | |
| Co/Fe | 34 | 30 | 29 |
| Al/Fe | 6.7 | 11.3 | 5.9 |
| Si/Fe | 3.3 | 0.03 | 0.10 |
| Y/Fe | 0.01 | 6.8 | 8.3 |

TABLE 1-continued

Ferromagnetic powder

| Characteristics of ferromagnetic powder | Ferromagnetic metal powder A | Ferromagnetic metal powder B | Ferromagnetic metal powder C |
|---|---|---|---|
| Sm/Fe | 3.8 | 0 | 0 |
| Mg/Fe | 0 | 0.8 | 0.7 |
| Ca/Fe | 0.01 | 0.04 | 0.03 |
| Na/Fe | 0.01 | 0.10 | 0 |
| Magnetic characteristics | | | |
| Hc (Oe) | 2400 | 2360 | 2450 |
| σs (emu/g) | 140 | 154 | 158 |
| Powder SFD | 0.944 | 0.968 | 0.922 |
| Others | | | |
| pH | 9.0 | 9.0 | 9.1 |

SBET represents a specific surface area by BET method.

[Preparation of Polyurethane Resin]
(Synthesis of Polyurethane Resin A)

In a container equipped with a reflux condenser and a stirrer and with the air inside replaced with nitrogen in advance, HBpA shown below, BpA-PPO700 shown below, and PPG400 and DEIS as other diols, in the molar ratio HbpA:BpA-PPO700:PPG400:DEIS of 24:14:10:2 were dissolved in a mixed solvent containing cyclohexanone and dimethylacetamide in the weight ratio of 50:50, and then dissolved at 60° C. under nitrogen stream. Here, di-n-dibutyl-tin-dilaurate may be added as catalyst by 60 ppm with respect to the total amount of the raw materials used.

Next, MDI (4, 4-diphenylmethanediisocyanate) was added in the same moles as that of the total of the diols, and heating reaction was performed at 90° C. for 6 hours, and Mn 25000 of polyurethane resin A was obtained with Mw 45000 which contains ether group of 4.0 nmol/g as well as introduced —SO$_3$Na group of 8×10$^{-5}$ mol/g.

Here, the symbols and abbreviations used are as follows:

HBPA: Hydrogenated bisphenol A (Rikabinol HB manufactured by New Japan Chemical Co., Ltd.)

BpA-PPO700: Polypropylene oxide addition product of bisphenol A (molecular weight 700)

PCL400: Polycaprolactonepolyol (molecular weight 400)

PPG400: Polypropylene glycol (molecular weight 400)

DEIS: Sodium salt of bis (2-hydroxyethyl) sulfoisophthalate

With the use of the aforementioned ferromagnetic metal powder and the polyurethane resin A, following magnetic layer liquid and nonmagnetic layer liquid were prepared.

Coating Liquid Prescription (1) Nonmagnetic lower layer

| | |
|---|---|
| Nonmagnetic powder α-Fe$_2$O$_3$ | 85 parts |
| Carbon black | 15 parts |
| Average primary particle diameter | 16 nm |
| DBP oil absorption amount | 80 ml/100 g |
| pH | 8.0 |
| BET specific surface area | 250 m$^2$/g |
| Volatile content | 1.5% |
| Vinyl chloride copolymer | 7 parts |
| MR-110 manufactured by Nippon Zeon, Co., Ltd | |
| Polyester polyurethane resin A | 5 parts |

-continued

| | |
|---|---|
| Butyl stearate | 1 part |
| Stearic acid | 1 part |
| Methyl ethyl ketone | 120 parts |
| Cyclohexanone | 120 parts |
| Phenyl phosphonic acid (PPA) | 3 parts |
| (2) Magnetic Layer | |
| Ferromagnetic metal powder (See, Table 1) | 100 parts |
| Polyester polyurethane resin A | 10 parts |
| α-alumina (particle size 0.18 μm) | 5 parts |
| Carbon black (particle size 0.10 μm) | 0.5 part |
| Butyl stearate | 1.5 parts |
| Stearic acid | 0.5 part |
| Methyl ethyl ketone | 120 parts |
| Cyclohexanone | 120 parts |
| Phenyl phosphonic acid (PPA) | 5 parts |

[Manufacture of Magnetic Recording Medium]

Examples 1 to 5 and Comparative Examples 1 to 2

After kneading and dispersing each component of the prescription of the magnetic layer liquid and the prescription of the nonmagnetic layer liquid, and 5 parts of polyisocyanate (Coronate L manufactured by Nippon Polyurethane Co., Ltd) was added only to a mixture for the nonmagnetic layer, the mixtures were filtered using a filter having a mean pore diameter of 1 μm, thereby each coating liquid was prepared. On a surface of a polyethylene naphthalate support having the thickness of 5.2 μm and the centerline surface roughness of 0.001 μm, the obtained coating liquid for the nonmagnetic layer was coated using a reverse roller in such an amount as to form the dry thickness of 1.4 μm, and immediately after this, the magnetic layer coating liquid was coated in such an amount as to form the thickness described in Table 2. These layers were coated by a simultaneous multilayer coating method. While the both layers were still in a wet state, the layers were subject to orientation by a Co-Sm magnet having a magnetic force of 6000 G and a solenoid having a magnetic force of 4000 G. After that, the layers were dried and then a back coating layer having a thickness of 0.5 μm was coated. Then, calendering process was made by passing through six nips, each of which comprising metal rollers and epoxy resin rollers under the condition at a temperature of 80° C., a linear pressure of 350 kg/cm, and a speed of 50 m/min, and then slitting it in the width of 6.35 mm, thereby producing tapes for DVC video.

Characteristics of the examples and the comparative examples of the magnetic recording medium thus obtained were measured with the following measuring method, and the results will be shown in Table 2.

[Measuring Method]

Average thickness d and Standard deviation σ of magnetic layer:

In a case of a multilayer structure, an average thickness d of the magnetic layer and a standard deviation σ of the thickness of the magnetic layer were measured with the following methods. In a case of a magnetic layer with single layer; the measurement was also made accordingly.

The magnetic recording medium was cut across the longitudinal direction by using a diamond cutter to have a thickness of approximately 0.1 μm, and the cutting piece was observed with a transmission type electron microscope at 10,000 to 100,000-power magnification, preferably 20,000 to 50,000-power magnification, and then the photograph of the cutting piece was taken. The photograph print size was from A4 to A5 sizes. Thereafter, the interface between the magnetic layer and the nonmagnetic layer was visually determined to be bordered in black by paying particular attention to the difference in shape between the ferromagnetic metal powder and the nonmagnetic inorganic powder of the magnetic layer and the nonmagnetic layer, as well as the surface of the magnetic layer was also bordered in black. The lengths of the lines thus bordered in black were measured by using an image processing apparatus (IBAS2, manufactured by Zeiss Co.Ltd.). When a length of an sample photograph was 21 cm, measurements were made from 85 to 300 times. The average value of the measured values at this time was taken as d, and a standard deviation σ is given by following formula.

$$\sigma = [\{(i\ d1-d)2+(d2-d)2+ \ldots +(dn-d)2\}/(n-1)]1/2$$

d1, d2, , dn represent the respective measured values. Symbol n is 85 to 300.

Photographs with respect to the average particle number of the pieces of the magnetic particles existing in the magnetic layer thickness direction were taken with a transmission type electron microscope at 50,000 to 100,000-power magnification. Regarding the randomly selected 200 pieces of the photographs from the sample photographs, the number of pieces of the magnetic particles existing in the magnetic layer thickness direction was given respectively, and then the average particle number m of those numbers was calculated.

Magnetic characteristics (Hc, SFD, SQ, Bm, φm):

They were measured using a vibration sample type fluxmeter (manufactured by Toei Kogyo Co., Ltd.) at a applied magnetic field, Hm, of 10 KOe. Bm was calculated based on the aforementioned average thickness and φm of the magnetic layer.

Ra: By an optical interference method using a digital optical profimeter (manufactured by WYKO), the Ra was obtained as centerline average roughness measured under cut-off value of 0.25 mm.

3D-MIRAU PSD: PSD (Power Spectrum Density) was calculated by multiplying a sampling interval by the square of the height, showing the power measured in $nm^3$ unit. PSD values were calculated with respect to the roughness components at pitch of 5 μm and at pitch of 10 μm.

AFM:PSD-4.3 μm : By using Nano Scope 3 manufactured by Digital Instruments, a surface roughness at a square angle measured 30 μm was measured with the quadrangular pyramid probe made of SiN having a ridge degree of 70. Power spectrum was made based on the frequency analysis of the surface roughness. PSD (Power Spectrum Density) was calculated by multiplying a sampling interval by the square of the height, showing the power measured in $nm^2$ unit. PSD value was calculated with respect to the roughness component at pitch of 4.3 μm.

DVC 1/2 Tb output, Total C/N ratio, Medium C/N ratio: 1/2 Tb C/N ratio was measured by using a drum tester. The head used was an MIG head having Bs of 1.2 T and a gap length of 0.22 μm for recording and reproducing. The head and medium during recording and reproducing had correlative speed of 10.5 m/sec and recorded a single frequency signal of 21 MHz, and reproducing spectrum was observed with a spectrum analyzer manufactured by Shibasoku. The C/N ratio was a ratio of the carrier output of 21 MHz to the noise of 18.7 MHz. The medium C/N ratio was measured by deducting the amplifier noise from the value as mentioned above.

TABLE 2

| | Ex. 1 | Ex. 2 | Ex. 3 | Ex. 4 | Ex. 5 | Comp. Ex. 1 | Comp. Ex. 2 |
|---|---|---|---|---|---|---|---|
| Upper layer: Ferromagnetic powder | B | → | → | C | A | B | → |
| Major axis length l in magnetic layer: $\mu$m | 0.1 | → | → | 0.125 | 0.11 | 0.1 | → |
| Thickness d of upper layer magnetic layer: $\mu$m | 0.1 | 0.033 | 0.25 | 0.08 | 0.12 | 0.5 | 0.25 |
| Thickness of magnetic layer Standard deviation $\sigma$:$\mu$m | 0.024 | 0.012 | 0.64 | 0.018 | 0.026 | 0.14 | 0.06 |
| d/l ratio | 1 | 0.33 | 2.5 | 0.64 | 1.09 | 5 | 2.5 |
| Thickness d of lower layer nonmagnetic layer: $\mu$m | 1.4 | → | → | → | → | → | None |
| Average number m of magnetic particles existing in an upper layer magnetic layer thickness direction | 8 | 3 | 16 | 7 | 5 | 25 | 17 |
| Tape magnetic characteristics: Hc | 2300 | 2360 | 2270 | 2310 | 2440 | 2250 | 2200 |
| SFD | 0.20 | 0.25 | 0.19 | 0.15 | 0.29 | 0.19 | 0.19 |
| SQ | 0.88 | 0.87 | 0.88 | 0.91 | 0.84 | 0.88 | 0.88 |
| Bm | 6300 | 8400 | 5800 | 7800 | 5400 | 5200 | 4000 |
| Surface property of magnetic layer: Ra (nm) | 2.1 | 1.9 | 2.6 | 2.0 | 2.2 | 3.0 | 4.4 |
| 3D MIRAU-PSD: 10 $\mu$m (nm$^3$) | 4600 | 6000 | 10000 | 3000 | 5600 | 15000 | 38000 |
| 3D MIRAU-PSD: 5 $\mu$m (nm$^3$) | 1500 | 1000 | 2000 | 900 | 2000 | 3000 | 18000 |
| AFM: PSD-4.3 $\mu$m (nm$^2$) | 0.64 | 0.2 | 0.7 | 0.15 | 0.7 | 0.9 | 32 |
| AFM Surface projection: 40 nm ↑ | 0 | 0 | 1 | 0 | 1 | 3 | 30 |
| AFM Surface projection: 20 nm ↑ | 20 | 12 | 32 | 8 | 40 | 85 | 2000 |
| DVC 1/2 Tb Output | 0 | −2.4 | −0.5 | 0.6 | −0.5 | −1 | −6 |
| DVC total C/N | −1.6 | −3.4 | −2.0 | −0.4 | −2.0 | −2.6 | −8 |
| DVC medium C/N | −4.0 | −4.4 | −4.7 | −2.0 | −4.8 | −6.0 | −12.6 |

Example 1 was an example in which the number of the magnetic particles existing in an upper layer magnetic layer thickness direction was reduced by coating the upper layer with a thin thickness compared with Comparative example 1. With this change, Bm and a roughness component at a pitch of 10 $\mu$m and surface projection height on the magnetic layer surface were reduced, thus to improve the medium C/N ratio.

Example 2 is an example in which the number of the magnetic particles existing in the upper layer magnetic layer thickness direction was lowered, by coating the upper layer further thinner than that of Example 1. The magnetic layer surface became smooth due to improving the Bm more than that of Example 1. Since the MIG head was used for measuring the electromagnetic characteristics of the surface, the output became lowered as the thickness of the upper layer magnetic layer was being reduced, but the medium noise was reduced due to the smoothing of the plane, and consequently, less reduction of the medium C/N ratio was made.

Example 3 was an example in which the number of the magnetic particles existing in the upper layer magnetic layer thickness direction was increased compared with that of Example 1 by coating the thick upper layer magnetic layer. Compared with Example 1, Bm and smoothness of the magnetic layer surface were lowered, but Bm was high in comparison with Comparative example 1, and the magnetic layer surface was smooth.

Example 4 was an example in which the number m of the magnetic particles existing in the upper magnetic layer thickness direction was set 7, or m=7, by using flat acicular particles as the ferromagnetic powder. Compared with Example 1, Bm was improved and the magnetic layer surface became smooth. In addition, the medium C/N ratio was improved in comparison with Example 1.

Example 5 was an example in which the number m of the magnetic particles existing in the upper magnetic layer thickness direction was set 5, or m=5, by using spindle-shaped acicular particles as the ferromagnetic powder. Bm was lowered as well as the surface property of the magnetic layer was lowered, in comparison with Example 1 and Example 4 which had approximate values of the thicknesses of the upper layer magnetic layer utilizing the flat acicular particles.

Comparative example 2 is an example having the same structure as that of Example 3, except that the nonmagnetic lower layer was omitted. Since the nonmagnetic lower layer was omitted, the calender molding property was lowered, and influences of the abrasives, carbon particles and aggregations in the upper layer magnetic layer, or an influence of the base surface projection were found, and therefore the Bm of the magnetic layer and the surface property of the magnetic layer were considerably reduced.

As for the medium C/N ratio measurement, all of Examples 1 to 5 satisfied equal to or higher than −5 dB.

The present invention can provide a magnetic recording medium capable of reducing a medium noise and exhibiting a high C/N ratio even under high-density magnetic recording such as that employed in the system utilizing an MR head.

What is claimed is:

1. A magnetic recording medium comprising, on a nonmagnetic support, a nonmagnetic layer containing a nonmagnetic powder and a binder and a magnetic layer containing a ferromagnetic powder and a binder in this order, wherein the average thickness, d, of said magnetic layer ranges from 0.01 to 0.3 μm, and the average particle number, m of the ferromagnetic powder existing in said magnetic layer thickness direction is in the range of 1 to 20, and wherein the particle of the ferromagnetic powder contained in the magnetic layer has a flat acicular shape and the particle of the flat acicular ferromagnetic powder has an aspect ratio of a cross section in a direction perpendicular to the major axis of more than 1.

2. The magnetic recording medium according to claim 1, wherein the particle of the ferromagnetic powder contained in said magnetic layer has an acicular shape and the mean length, l, of the major axis is in the range of 0.02 to 0.15 μm, and the ratio, d/l, of the average thickness, d, of said magnetic layer to the mean length, l, of the major axis of the particle of the ferromagnetic powder is equal to or less than 4.

3. The magnetic recording medium according to claim 1, wherein the average value, d, of the thickness of the magnetic layer is in the range of 0.01 μm to 0.1 μm.

4. The magnetic recording medium according to claim 1, wherein the average particle number, m, of the ferromagnetic powder existing in the thickness direction of the magnetic layer is in the range of 2 to 6.

5. The magnetic recording medium according to claim 1, wherein the mean length, l, of major axis of the acicular ferromagnetic powder is in the range of 0.04 to 0.12 μm, and the ratio d/l of an average thickness, d, of the magnetic layer to a mean length, l, of major axis of the particle of the ferromagnetic powder is in the range of 2 to 0.06.

6. The magnetic recording medium according to claim 1, wherein the flat acicular ferromagnetic powder is elliptical or polygonal and where a cross section of a minor axis cut in a direction perpendicular to the major axis has both a longer width and a shorter width.

7. The magnetic recording medium according to claim 6, wherein a ratio of the longer width to the shorter width of the flat acicular magnetic particle is equal to or higher than 2.0.

8. The magnetic recording medium according to claim 6, wherein the flat acicular ferromagnetic powder has a Co content of 5 to 50 at %, an Al content of 0.1 to 12 at %, a content of rare earth metal of 0.1 to 12 at %, and an atomic ratio of Al to rare earth metal in the range of 0.5 to 2.

9. The magnetic recording medium according to claim 1, wherein a nonmagnetic powder is contained in the magnetic layer in the range of 5 to 15 parts by weight with respect to the ferromagnetic powder of 100 parts by weight and the binder contained in the magnetic layer is a polyurethane resin having a polar group.

10. The magnetic recording medium according to claim 9, wherein the existing ratio of the polyurethane resin in the binder contained in the magnetic layer ranges from 50 to 100% by weight.

* * * * *